Feb. 19, 1957 E. V. RIPPINGILLE 2,782,009
HEAT EXCHANGERS
Filed March 14, 1952 3 Sheets-Sheet 1

INVENTOR.
Edward V. Rippingille
BY
Willits, Helming & Baillie
ATTORNEYS

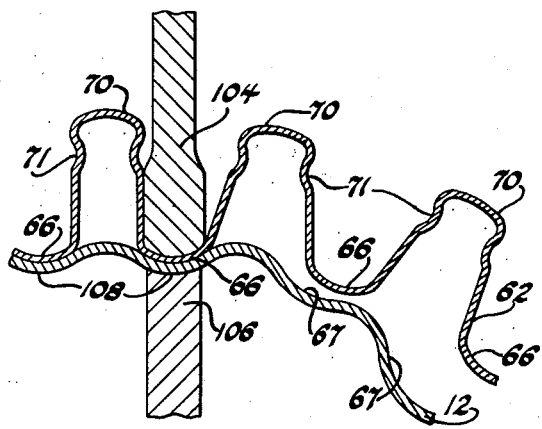
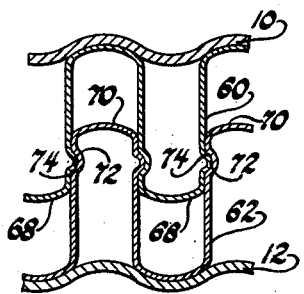
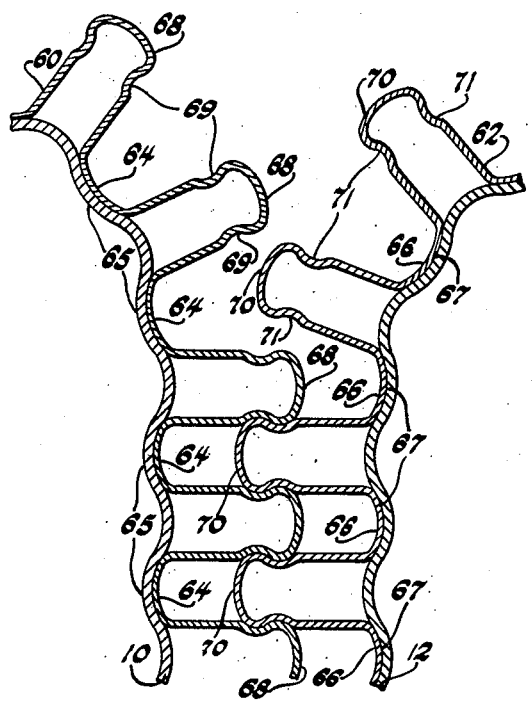
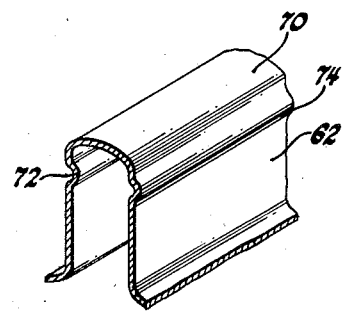
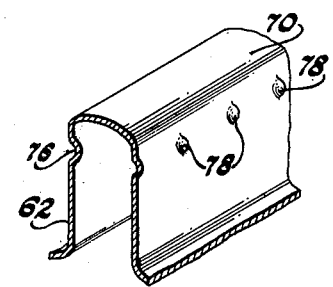
INVENTOR.
Edward V. Rippingille
BY
ATTORNEYS INVENTOR.
Edward V. Rippingille
BY
ATTORNEYS United States Patent Office 2,782,009
Patented Feb. 19, 1957

2,782,009

HEAT EXCHANGERS

Edward V. Rippingille, Farmington, Mich., assignor to General Motors Corporation, Detroit, Mich., a corporation of Delaware Application March 14, 1952, Serial No. 276,567

7 Claims. (Cl. 257—245)

This invention relates to heat exchangers and to the method of fabricating heat exchangers.

In the fabrication of heat exchangers for various uses such as cooling of transmission oil, or cooling of exhaust gases of engines or turbines, the various joints thereof are either brazed or soldered. This is done in many cases in order to maintain intimate contact between the contacting surfaces of the fabricated structure so that efficient heat conductivity therebetween will be assured. However, soldered or brazed joints are inadequate in cases where the heat exchangers are subjected to relatively high temperatures, since they are unable to withstand such temperatures. Consequently, in heat exchangers employed for the cooling either of gases or other high temperature fluids, conventional methods of providing heat conducting joints between the parts thereof cannot be availed of.

One object of the present invention is to provide a heat exchanger wherein the joints between the various contacting surfaces of the parts thereof remain in intimate thermal contact regardless of the temperature conditions to which it is exposed.

Another object is to provide a heat exchanger having heat absorbing fins associated therewith which are welded in position, thereby assuring effective thermal contact between the parts thereof throughout the temperature range at which the device is operated.

A further object is to provide a heat exchanger consisting of spaced plates defining alternate passages for fluids of different types and to provide an interlocking arrangement of fins in certain of said passages.

A still further object is to provide in a heat exchanger of the class described, spaced plates defining passages for fluid, heat absorbing fins of substantially sinuous construction welded to one of said plates, heat absorbing fins of substantially sinuous construction welded to the other of said plates, and to provide interlocking means between the undulations of the heat absorbing fins extending away from each of the associated plates, thereby preventing relative movement of the latter.

A still further object is to provide in heat absorbing means of the stated character a series of openings or louvres through which fluid may pass.

A still further object is to provide a heat exchanger which is simple in construction, economic in manufacture, and highly efficient and durable in operation.

Of the drawings:

Fig. 3 is a sectional view of a portion of one of the plates of the heat exchanger shown in Figs. 1 and 2, showing the method of welding the heat absorbing means thereto.

Fig. 4 is a fragmentary sectional view of a portion of one of the passages of the heat exchanger shown in Figs. 1 and 2 showing the method of assembling the sections thereof in position.

Fig. 5 is a fragmentary sectional view of one of the passages of a heat exchanger, showing heat absorbing means associated therewith of a modified construction.

Fig. 6 is a fragmentary perspective view, partly in section, of a portion of the heat absorbing means shown in Fig. 5.

Fig. 7 is a view similar to Fig. 6 but showing a still further modification.

Figure 1:
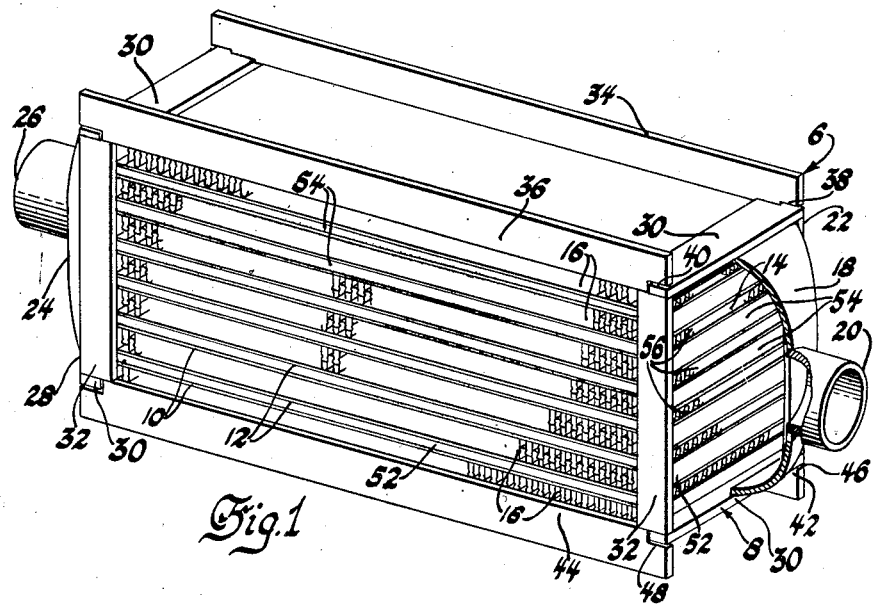
Fig. 1 is a perspective view, partly in section, of a heat exchanger, with certain parts thereof removed to more clearly show the structure of certain features thereof.
Figure 2:
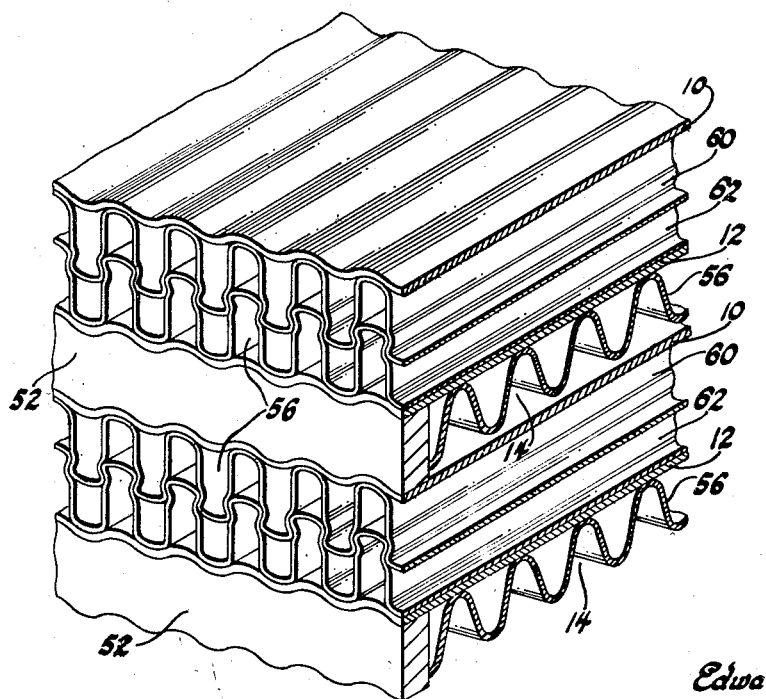
Fig. 2 is an enlarged perspective view of a fragmentary portion of the heat exchanger shown in Fig. 1.

Referring to the drawings, the numeral 6 designates generally a heat exchanger which in the present instance consists of a framework 8 and a series of spaced plates 10 and 12 defining alternately disposed passages 14 and 16 for fluids of different types. An inlet header 18 having a fitting 20 thereon is secured to framework 8 at the inlet end 22 of heat exchanger 6. An outlet header 24 having a fitting 26 is secured to framework 8 at the discharge end 28 of heat exchanger 6. The inlet header 18 is welded or otherwise secured at the sides thereof to the relatively flat horizontal and vertical members 30 and 32 which form the portion of the framework 8 surrounding the inlet end 22 of heat exchanger 6. A pair of vertically disposed longitudinally extending plates 34 and 36 having cut-away portions 38 and 40 are secured at one end thereof to the reduced end portions of upper frame member 30. A similar pair of vertically disposed longitudinally extending plates 42 and 44 having cut-away portions 46 and 48 at the ends thereof, are similarly secured at one end thereof to the reduced portions of lower frame member 30. Header 24 is similarly secured to the substantially horizontal and vertical frame members 30 and 32 secured to the outlet or discharge end 28 of heat exchanger 6. The other ends of longitudinally extending members 34, 36 and 40, 42 are also secured to the horizontal frame members 30 at the discharge end 28 of heat exchanger 6 by welding or by any other suitable means. The sides of passages 14 extending between inlet and outlet headers 18 and 24 are closed by sealing plates 52 which may be secured to plates 10 and 12 by welding or by any other suitable means. The sides of passages 16 disposed adjacent inlet and outlet headers 18 and 24 are likewise closed by sealing plates 54 which also may be secured to the ends of plates 10 and 12 by welding or by other suitable means.

Each passage 14 has provided therein a heat absorbing element 56 of substantially sinuous construction, which may be secured in intimate contact with the sides of plates 10 and 12 defining said passage. The passages 14 conduct exhaust gases or other high temperature fluids entering heat exchanger 6 through inlet fitting 20 to outlet header 24. The passages 16 conduct cooling air or other cooling fluid therethrough in a direction substantially at right angles to the flow of fluid in passages 14. The passages 14 and 16 by virtue of sealing plates 52 and 54, respectively, are completely sealed from each other.

As shown in Figs. 1 to 4, each passage 16 has provided therein oppositely disposed heat absorbing members 60 and 62 of substantially sinuous construction. The upper undulations 64 of the heat exchange member 60 are welded to the concave portions 65 of corrugated plate 10. Similarly, the convex ends 66 of the alternately disposed undulations of heat absorbing member 62 are welded to the concave portions 67 of corrugated plate 12. The inner ends 68 of alternate undulations of heat absorbing member 60 are provided with reduced neck portions 69. Similarly, the inner ends 70 of alternately disposed undulations of heat absorbing member 62 are provided with reduced neck portions 71. To assemble the plates 10 and 12, the ends 68 and 70 of members 60 and 62 disposed at one end thereof are interlocked as shown in Fig. 4 while the upper ends of the plates are bent away from each other. The plates are then brought toward each other causing the end portions 68 and 70 to successively interlock with each other at the neck portions 69 and 71, respectively, thereof until the entire assembly has been brought into proper position. When the members 60 and 62 have been thus assembled in position, it is apparent that the plates 10 and 12 are effectively locked against relative movement. In assembling the construction, each pair of plates 10 and 12 are assembled in the manner just described and the heat absorbing inserts 56 are then placed between adjoining pairs of such plates and finally the end plates 52 and 54 are welded to close the sides of the associated passages 14 and 16, respectively. The frame 8 is then assembled on the structure and inlet and outlet headers 18 and 24 welded in position.

By welding the parts in position, the joints therebetween are unaffected by heat and, consequently, efficient heat conduction therethrough is maintained during the most severe conditions of operation. The heat absorbed by the plates 10 and 12 and heat absorbing elements 56 is conducted through the said plates to the heat absorbing members 60 and 62 in the passages 16 and is then rapidly dissipated to the air or other coolant circulating through said passages. The hot gases or other fluids flowing through passages 14 are thus effectively cooled when they discharge through fitting 26.

Figs. 5 and 6 illustrate a further modification of the invention. In this construction the heat absorbing elements 60 and 62 extending from plates 10 and 12 are provided with a somewhat different interlocking means. The inwardly extending ends 68 and 70 of members 60 and 62, respectively, have each provided at one side thereof, a longitudinally extending recess 72 and a correspondingly shaped rib 74 at the other side. In assembling this structure, an end rib 74 on member 60 is arranged to fit into a recess 72 on the member 62. The device is then assembled in the manner shown at Fig. 4. The interlocking relation of the ribs 74 and recesses 72 effectively retains the plates 10 and 12 in properly spaced position.

Fig. 7 shows a still further modification. In this construction instead of providing recesses and ribs on the inwardly extending undulations 68 and 70 of the heat absorbing members 60 and 62, respectively, one side of each of said undulations is provided with a series of spaced semi-spherical recesses 76 and the other side with a series of correspondingly spaced semi-spherical projections 78. In assembly the projections 78 of heat absorbing member 60 extend into the recesses 76 provided on the heat absorbing member 62 thereby effectively locking the two sections in position.

Figure 8:
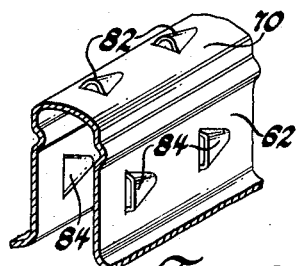
Fig. 8 is a view similar to Fig. 6 but showing a still further modification.

Fig. 8 shows a construction somewhat on the order of that shown in Figs. 5 and 6 except that each of the heat absorbing members 60 and 62 has provided at the end and sides of the undulations 68 and 70, respectively, louvres 82 and 84. By this construction the air or other cooling fluid may flow through the openings provided by the louvres 82 and 84, and thus more effectively contact the heat absorbing surfaces of members 60 and 62.

Figure 9:
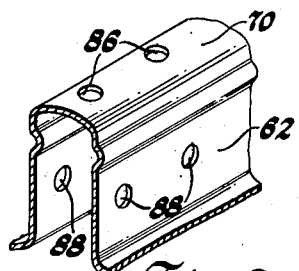
Fig. 9 is a view similar to Fig. 8 but showing a still further modification of the invention.

Fig. 9 shows a construction similar to that shown in Fig. 8 except that openings 86 and 88 are provided in the undulations of the heat absorbing members 60 and 62 extending away from the associated plates 10 and 12 instead of louvres. In this construction, like that shown in Fig. 8, cooling air or other cooling fluid is adapted to flow through the openings 86 and 88 and thereby more effectively contact the side walls of the said heat absorbing members 60 and 62.

Figure 10:
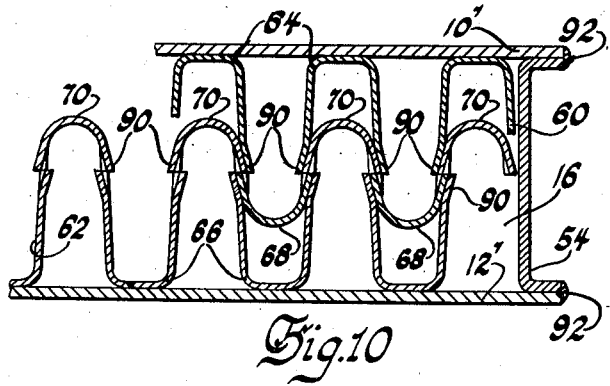
Fig. 10 is a sectional view taken through one of the passages of a heat exchanger showing the structure and arrangement of heat absorbing means associated therewith of a still further modified construction.
Figure 11:
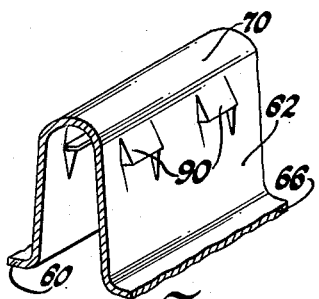
Fig. 11 is a fragmentary perspective view, partly in section, showing the structure of a portion of the heat absorbing means shown in Fig. 10.

Figs. 10 and 11 show a still further modification. In this construction the plates 10' and 12' define the passages 14 and 16 and are flat rather than corrugated. Each passage 16 has provided therein oppositely disposed heat absorbing members 60 and 62 of substantially sinuous construction. The undulations 64 of heat absorbing member 60 are relatively flat at the upper ends thereof and are secured to the inner surface of plate 10 by welding. The lower undulations 66 of heat absorbing member 62 are also relatively flat and are secured to the inner surface of plate 12' by welding. The inner ends of undulations 68 and 70, respectively, of heat absorbing elements 60 and 62 are rounded and the sides thereof have struck out therefrom spaced shoulders 90. In assembly of the parts, as shown in Fig. 10, the shoulders 90 provided near the end of undulations 68 of member 60 overlap and interengage the shoulders 90 provided near the end of the undulations 70 of heat absorbing member 62. By this interlocking arrangement of the heat absorbing members 60 and 62 the plates 10' and 12' are properly spaced and effectively held in position. After the plates have been properly spaced, the end plates 54 are inserted in position and welded to said plates, as shown at 92 in Fig. 10. The sinuous heat absorbing members 56 are then placed in position and the side plates 52 welded to plates 10' and 12'.

Figure 12:
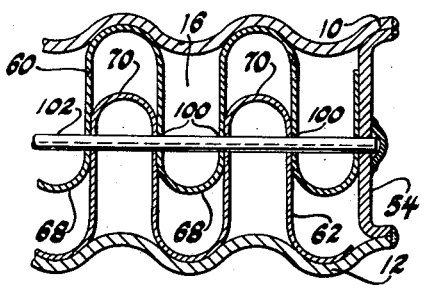
Fig. 12 is a sectional view of a portion of one of the passages of a heat exchanger, showing heat absorbing means of a still further modified construction.

Fig. 12 shows a still further modification of the present invention. In this construction, heat absorbing members 60 and 62 are welded to and extend inwardly from spaced side plates 10 and 12. The undulations 68 and 70 of members 60 and 62 extending inwardly from plates 10 and 12, respectively, are provided with aligned openings 100 for receiving a locking bar 102. The locking bar 102 is supported in aligned apertures provided in the end plates 54 welded to plates 10 and 12 at the opposite sides of the passages 16. By this construction the plates 10 and 12 as well as the heat absorbing members 60 and 62 welded thereto are effectively held against relative movement.

Fig. 3 discloses the method of welding the heat absorbing members 60 and 62 to the associated plates. Inasmuch as the welding process is the same for each of the plates 10 and 12, the method of welding the fin 62 to plate 12 only will be described. Electrodes 104 and 106 are successively positioned against the concave portions 66 of member 60 and the convex sides 108 of plate 12. By bringing the energized electrodes 104 and 106 into contact with the parts as shown in Fig. 3, effective welding of the latter results. One advantage of providing corrugated plates 10 and 12 is that the heat absorbing members 60 and 62 may be accurately attached at equally spaced points along the length of said plates. It is also seen that substantial surfaces of the parts are welded together which not only provides strong joints but also assures exceptionally good heat transfer to the portions of the heat absorbing members extending into the cooling passages 16.

From the foregoing description it is seen that effective heat exchangers have been provided. The heat absorbing elements are so constructed that they may be welded to the spaced plates defining the passages for air or other cooling fluid. By forming interlocking connections between the heat absorbing means it is possible to effectively weld them to their associated plates. After they have been welded the parts may then be assembled into interlocking relation with each other. It is also seen that by the novel interlocking arrangements disclosed, assembly of the parts is greatly facilitated. The arrangement of the corrugated plates and sinuous types of heat absorbing means also facilitates welding of the parts in position in that the portions of the plates and heat absorbing means to be welded are definitely located.

While the embodiments shown and described herein are admirably adapted to perform the functions intended, it is apparent that other modifications and changes may be made without departing from the spirit of the invention. It therefore is to be understood that it is not intended to limit the invention to the embodiments disclosed but only by the scope of the claims which follow.

What is claimed is:

1. A heat exchanger comprising spaced corrugated plates defining alternately disposed conduits for different fluids, a pair of sinuously shaped heat absorbing members extending between adjacent plates and delineating individual fluid passages, one of said members being fixedly secured to one of said adjacent plates, the other to the other of said adjacent plates, the walls of the individual undulations of said members being deformed substantially throughout their length to provide complementary portions through which said members are lockingly engaged.

2. A heat exchanger comprising spaced corrugated plates defining alternately disposed conduits for different fluids, a pair of sinuously shaped heat absorbing members extending between adjacent plates and delineating individual fluid passages, one of said members being fixedly secured to one of said adjacent plates, the other to the other of said adjacent plates, the walls of the individual undulations of said members being deformed substantially throughout their length to provide complementary head and neck portions through which said members are lockingly engaged.

3. A heat exchanger comprising spaced corrugated plates defining alternately disposed conduits for different fluids, a pair of sinuously shaped heat absorbing members extending between adjacent plates and delineating individual fluid passages, one of said members being welded to one of said adjacent plates, the other to the other of said adjacent plates, the walls of the individual undulations of said members being deformed substantially throughout their length to provide complementary portions through which said members are lockingly engaged.

4. A heat exchanger providing spaced corrugated plates providing alternately disposed conduits, a pair of sinuously shaped heat absorbing members extending between adjacent plates and delineating individual fluid passages, the convex portions of the individual undulations of one of said members seating in the concave portions of one of said adjacent plates, the convex portions of the undulations of the other of said members seating in the concave portions of the other of said adjacent plates, the walls of the individual undulations of said members being distorted substantially throughout their length to provide complementary portions through which said members are lockingly engaged.

5. A heat exchanger comprising spaced corrugated plates defining alternately disposed conduits for different fluids, a pair of sinuously shaped heat absorbing members extending between adjacent plates and delineating individual fluid passages, one of said members being welded to one of said adjacent plates, the other to the other of said adjacent plates, the walls of the individual undulations of said members being deformed substantially throughout their length to provide complementary portions through which said members are lockingly engaged in overlapped relation.

6. A heat exchanger according to claim 5 wherein said members are louvered.

7. A heat exchanger comprising spaced corrugated plates defining alternately disposed conduits for different fluids, a pair of sinuously shaped heat absorbing members extending between adjacent plates and delineating individual fluid passages, one of said members being fixedly secured to one of said adjacent plates, the other to the other of said adjacent plates, the walls of the individual undulations of said members being deformed to provide complementary portions through which said members are interconnected, the deformations taking the form of struck out portions extending substantially the length of said members.

References Cited in the file of this patent

UNITED STATES PATENTS

| Number | Name | Date |
|---|---|---|
| 1,102,366 | Todd | July 7, 1914 |
| 1,208,790 | Junkers | Dec. 19, 1916 |
| 1,349,011 | Spery | Aug. 10, 1920 |
| 1,762,446 | Ljungstrom | June 10, 1930 |
| 2,020,957 | Oppe et al. | Nov. 12, 1935 |
| 2,058,022 | Lebre | Oct. 20, 1936 |
| 2,073,588 | Przyborowski | Mar. 9, 1937 |
| 2,419,233 | Spender | Apr. 22, 1947 |
| 2,526,135 | Holmes et al. | Oct. 17, 1950 |
| 2,539,870 | Simpelaar | Jan. 30, 1951 |
| 2,576,213 | Chausson | Nov. 27, 1951 |
| 2,595,457 | Holm et al. | May 6, 1952 |
| 2,703,700 | Simpelaar | Mar. 8, 1955 |

FOREIGN PATENTS

| Number | Country | Date |
|---|---|---|
| 398,443 | Great Britain | Sept. 14, 1933 |
| 417,522 | Italy | Jan. 20, 1947 |
| 574,210 | Great Britain | Dec. 27, 1945 |